US011363828B2

(12) United States Patent
Vega et al.

(10) Patent No.: US 11,363,828 B2
(45) Date of Patent: *Jun. 21, 2022

(54) PALATABLE BEVERAGES AND COMPOSITIONS WITH COCOA EXTRACT

(71) Applicant: MARS, INCORPORATED, McLean, VA (US)

(72) Inventors: Cesar Vega, Columbia, MD (US); Carol Lloyd, Gaithersburg, MD (US)

(73) Assignee: MARS, INCORPORATED, McLean, VA (US)

( * ) Notice: Subject to any disclaimer, the term of this patent is extended or adjusted under 35 U.S.C. 154(b) by 395 days.

This patent is subject to a terminal disclaimer.

(21) Appl. No.: 15/939,478

(22) Filed: Mar. 29, 2018

(65) Prior Publication Data

US 2019/0021370 A1 Jan. 24, 2019

Related U.S. Application Data

(63) Continuation of application No. 14/091,956, filed on Nov. 27, 2013, now abandoned, which is a continuation of application No. 13/041,297, filed on Mar. 4, 2011, now Pat. No. 8,623,442.

(60) Provisional application No. 61/408,347, filed on Oct. 29, 2010, provisional application No. 61/311,202, filed on Mar. 5, 2010.

(51) Int. Cl.
| *A23L 2/39* | (2006.01) |
| *A23L 2/52* | (2006.01) |
| *A23L 2/60* | (2006.01) |
| *A23L 2/68* | (2006.01) |
| *A23G 1/32* | (2006.01) |
| *A23G 1/42* | (2006.01) |
| *A23G 1/56* | (2006.01) |

(52) U.S. Cl.
CPC .............. *A23L 2/39* (2013.01); *A23G 1/32* (2013.01); *A23G 1/42* (2013.01); *A23G 1/56* (2013.01); *A23L 2/52* (2013.01); *A23L 2/60* (2013.01); *A23L 2/68* (2013.01)

(58) Field of Classification Search
CPC ..... A23L 2/39; A23L 2/52; A23L 2/60; A23L 2/68; A23G 1/32; A23G 1/42; A23G 1/56
See application file for complete search history.

(56) References Cited

U.S. PATENT DOCUMENTS

| 3,692,532 | A | 9/1972 | Shenkenberg et al. |
| 3,800,052 | A | 3/1974 | Inagami et al. |
| 4,031,264 | A | 6/1977 | Arolski et al. |
| 4,046,925 | A | 9/1977 | Igoe |
| 4,079,154 | A | 3/1978 | Yasumatsu |
| 4,212,893 | A | 6/1980 | Takahata |
| 4,676,988 | A | 6/1987 | Efstathiou et al. |
| 4,704,292 | A | 11/1987 | Kattenberg |
| 4,946,701 | A | 8/1990 | Tsai et al. |
| 5,389,394 | A | 2/1995 | Weyersbach et al. |
| 5,554,645 | A | 9/1996 | Romanczyk et al. |
| 6,015,913 | A | 1/2000 | Kealey et al. |
| 6,297,273 | B1 | 10/2001 | Romanczyk |
| 6,312,753 | B1 | 11/2001 | Kealey et al. |
| 6,358,544 | B1 | 3/2002 | Henry et al. |
| 6,461,652 | B1 | 10/2002 | Henry et al. |
| 6,509,045 | B2 | 1/2003 | Henry et al. |
| 6,582,747 | B2 | 6/2003 | Myers et al. |
| 6,607,761 | B2 | 8/2003 | Henry et al. |
| 6,652,896 | B2 | 11/2003 | Young et al. |
| 6,673,379 | B2 | 1/2004 | Kealey et al. |
| 6,777,005 | B1 | 8/2004 | Romanczyk et al. |
| 8,337,917 | B2 | 12/2012 | Chevaux et al. |
| 8,623,442 | B2 | 1/2014 | Vega et al. |
| 2002/0022061 | A1 | 2/2002 | Schmitz et al. |
| 2002/0061347 | A1 | 5/2002 | Henry et al. |
| 2002/0064578 | A1 | 5/2002 | Henry et al. |
| 2003/0082273 | A1 | 5/2003 | Iwasaki et al. |
| 2004/0065207 | A1 | 4/2004 | Oishi et al. |
| 2004/0071821 | A1 | 4/2004 | Ashourian et al. |
| 2004/0096547 | A1 | 5/2004 | Ferruzzi |
| 2004/0166142 | A1 | 8/2004 | Chevaux et al. |
| 2004/0191298 | A1 | 9/2004 | Nicklasson et al. |
| 2005/0129829 | A1 | 6/2005 | Hosoya |
| 2005/0158409 | A1 | 7/2005 | Takagaki et al. |
| 2006/0073242 | A1 | 4/2006 | Yamada et al. |
| 2006/0121158 | A1 | 6/2006 | Ferruzzi et al. |
| 2006/0257548 | A1 | 11/2006 | Crofskey et al. |
| 2007/0003640 | A1 | 1/2007 | Hammerstone et al. |
| 2007/0116824 | A1 | 5/2007 | Prakash et al. |
| 2007/0207188 | A1 | 9/2007 | Miller et al. |

(Continued)

FOREIGN PATENT DOCUMENTS

| JP | 2003310213 A | 11/2003 |
| JP | 2008099677 A | 5/2008 |

(Continued)

OTHER PUBLICATIONS

English translation of Third Party Submission filed Aug. 13, 2013 in counterpart Japanese Patent Application 2012-557134, 3 pages.
Givens, Meta. 1969. Modern Encyclopedia of Cooking. J.G. Ferguson Publishing Company, Chicago, III p. 220-222 & 226.
Farmer, Fannie. 1896. The Original Boston Cooking—School Cookbook. Weathervane Books, New York. p. 45.
Hayashi, Nobuyuki, et al., Reduction of Catechin Astringency by the Complexation of Gallate-Type Catechins with Pectin, Biosci. Biotechnol. Biochem., 69(7), 1306-1310, 2005.

(Continued)

*Primary Examiner* — Nikki H. Dees
(74) *Attorney, Agent, or Firm* — Baker Botts L.L.P.

(57) ABSTRACT

The present subject matter relates to palatable beverages and compositions such as non-chocolate flavored water soluble dry powder compositions comprising a cocoa extract which comprises cocoa polyphenols, and an edible acid. The present subject matter further relates to processes for formulating said beverages and compositions.

21 Claims, 11 Drawing Sheets

(56) References Cited

U.S. PATENT DOCUMENTS

| | | |
|---|---|---|
| 2007/0254068 A1 | 11/2007 | Nair et al. |
| 2008/0038409 A1 | 2/2008 | Nair et al. |
| 2008/0075805 A1 | 3/2008 | Dorr et al. |
| 2008/0261897 A1 | 10/2008 | Dorr et al. |
| 2008/0311252 A1 | 12/2008 | Selzer et al. |
| 2008/0317891 A1 | 12/2008 | Anderson et al. |
| 2009/0269439 A1 | 10/2009 | Moulay et al. |
| 2010/0055248 A1 | 3/2010 | Woelfel et al. |
| 2010/0068344 A1 | 3/2010 | Fukuda et al. |
| 2011/0268846 A1 | 11/2011 | Nair et al. |
| 2011/0293789 A1 | 12/2011 | Blondeel et al. |
| 2013/0165398 A1 | 6/2013 | Huber |

FOREIGN PATENT DOCUMENTS

| | | |
|---|---|---|
| JP | 2009099677 | 5/2008 |
| JP | 2008142074 | 6/2008 |
| WO | 9736497 A2 | 10/1997 |
| WO | 2005072717 | 8/2005 |
| WO | 2007002883 A1 | 1/2007 |
| WO | 2007106473 A2 | 9/2007 |
| WO | 2008083152 | 7/2008 |

OTHER PUBLICATIONS

Komatsu, Yoshihiro, et al., Effects of pH and Temperature on Reaction Kinetics of Catechins in Green Tea Infusion, Biosci. Biotech. Biochem., 57(6), 907-910, 1993.

Lesschaeve, Isabelle, et al., Polyphenois: factors influencing their sensory properties and their effects on food and beverage preferences, Am. J. Clin. Nutr., 81(suppl): 330S-335S, 2005.

Peleg, Hanna, et al., The influence of Acid on Astringency of Alum and Phenolic Compounds, Chem. Senses, 23:371-378, 1998.

Peleg, Hanna, et al., Bitterness and astringency of flavan-3-ol monomers, dimers and trimers, J. of the Science of Food and Agriculture, 79:1123-1128, 1999.

Sant'Angelo, Olivia, Article: Antioxidants and Flavor Masking, available at http://www.preparedfoods.com/copyright/BNP_GUID_9-5-2006_A_10000000000000818519?view=print, 2010.

Valentova, Helena, et al., Determination of Astringent Taste in Model Solutions and in Beverages, Czech J. Food Sci. vol. 19, No. 5: 196-200, 2001.

Bajec, Martha, et al., Astringency: Mechanisms and Perception, Critical Reviews in Food Science and Nutrition, 48:1-18, 2008.

Winter, Ruth. 1972. A Consumers' Dictionary of Food Additives. Crown Publishers, Inc., New York. p. 199.

Beckett, "Industrial Chocolate Manufacture and Use", 1994, p. 156.

Onwulata, "Encapsulated and Powdered Foods", CRC Press, p. 57-58, May 26, 2005.

Robbins, et al., "Method performance and multi-laboratory assessment of a normal phase high pressure liquid chromatograhy-fluorescence detection method for the quanitation of flavanols and procyanidins in cocoa and chocolate containing samples", Journal of Chromoatography A, 1216 (Apr. 2009) p. 4831-4840.

Schroeter, et al., "(−)-Epicatechin mediates beneficial effects of the flavanol-rich cocoa on vascular functions in humans", PNAS, vol. 103, No. 4, Jan. 2006 pp. 1024-1029.

Wetting Time as a function of Acid-to-Cocoa Extract ratio

♦ Wet

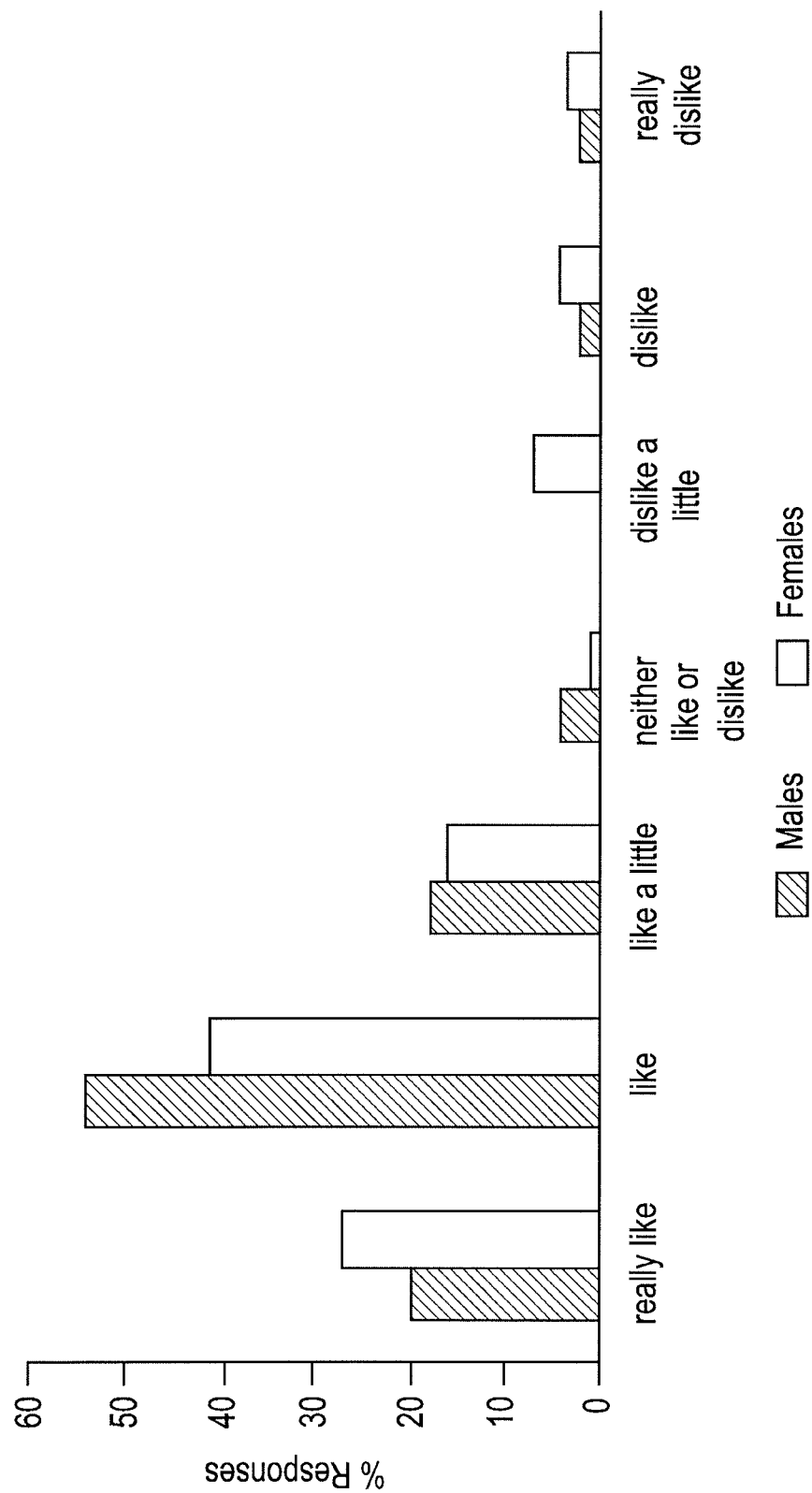

PALATABLE BEVERAGES AND COMPOSITIONS WITH COCOA EXTRACT

This is a Continuation Application of U.S. patent application Ser. No. 14/091,956, filed Nov. 27, 2013, an application claiming the benefit of U.S. patent application Ser. No. 13/041,297, filed Mar. 4, 2011, U.S. Provisional Application No. 61/311,202 filed Mar. 5, 2010 and U.S. Provisional Application No. 61/408,347 filed Oct. 29, 2010, the disclosure of each of which is hereby incorporated herein by reference.

FIELD OF THE INVENTION

The present subject matter relates to palatable beverages and compositions comprising a cocoa extract which comprises cocoa polyphenols, and an edible acid. The present subject matter further relates to processes for formulating said beverages and compositions.

BACKGROUND

Polyphenolic compounds are a broad class of bioactive substances derived from certain plant materials. Plant polyphenols have been associated with a variety of health benefits. Certain polyphenolic compounds including procyanidins occur naturally in cocoa. If processed properly, cocoa products including extracts, cocoa solids, and cocoa liquor can retain many of the original flavanols and procyanidins found in cocoa. When ingested, these cocoa polyphenols can provide significant health benefits to humans. For example, cocoa polyphenols have been shown to have beneficial effects on the flow mediated dilation of blood arteries and enhancing nitric oxide/nitric oxide synthase (NO/NOS) activity; such cardiovascular health effects are reported, for example, in WO 97/36497 published Oct. 9, 1997. Thus, the ingestion of cocoa products having a high cocoa polyphenol content may provide significant health benefits. Therefore, there is a need in the art for compositions providing cocoa polyphenols.

SUMMARY OF THE INVENTION

Surprisingly, it has been discovered that an edible acid under the conditions described herein, in the presence of a cocoa extract comprising cocoa polyphenols, has several advantages including: improving the palatability of compositions comprising cocoa extract, providing an appealing color to the compositions comprising cocoa extract, providing non-chocolate flavored compositions with cocoa extract and health benefits of cocoa polyphenols, and increasing the dispersibility of the cocoa polyphenols contained in the cocoa extract.

In one embodiment, the present subject matter is directed to a beverage such as a palatable beverage and a dry drink mix for the preparation thereof comprising an edible acid and additionally a cocoa extract comprising one or more cocoa polyphenols and in some embodiments the beverage and the mix may comprise a sweetener, e.g. a non-nutritive sweetener, such as sucralose, acesulfame K (Ace K) or combinations thereof. The dry drink mix may be a free-flowing dry powder red to maroon in color which may comprise particles of certain size described herein.

In another embodiment, the present subject matter is directed to a non-chocolate flavored water soluble/dispersible composition comprising a sweetener, e.g. a non-nutritive sweetener (such as sucralose, acesulfame K (Ace K) or combinations thereof), edible acid such as citric, tartaric and/or malic acid, a cocoa extract comprising one or more cocoa polyphenols and a carrier. The composition may further comprise a fruit flavor. It may also include cocoa extract having particles of a certain size described herein.

BRIEF DESCRIPTION OF THE FIGURES

FIG. 8 shows results of a palatability test in a test sample of seventy subjects using a hedonic rating scale. (Legend: left bar represents male subjects, right bar represents female subjects.)

DETAILED DESCRIPTION OF THE INVENTION

Figure 1:
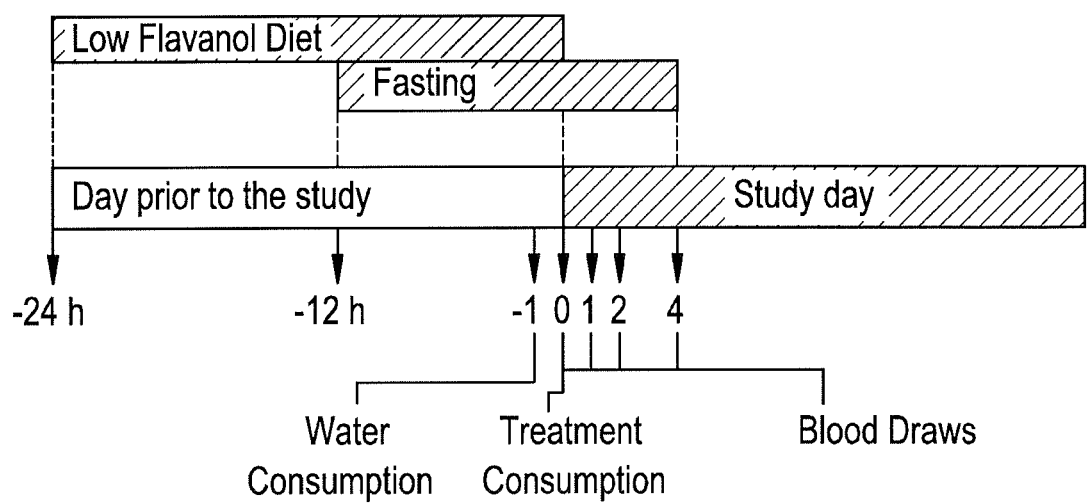
FIG. 1 shows the sampling paradigm of the day before and the day of the biological study described herein.
Figure 2:
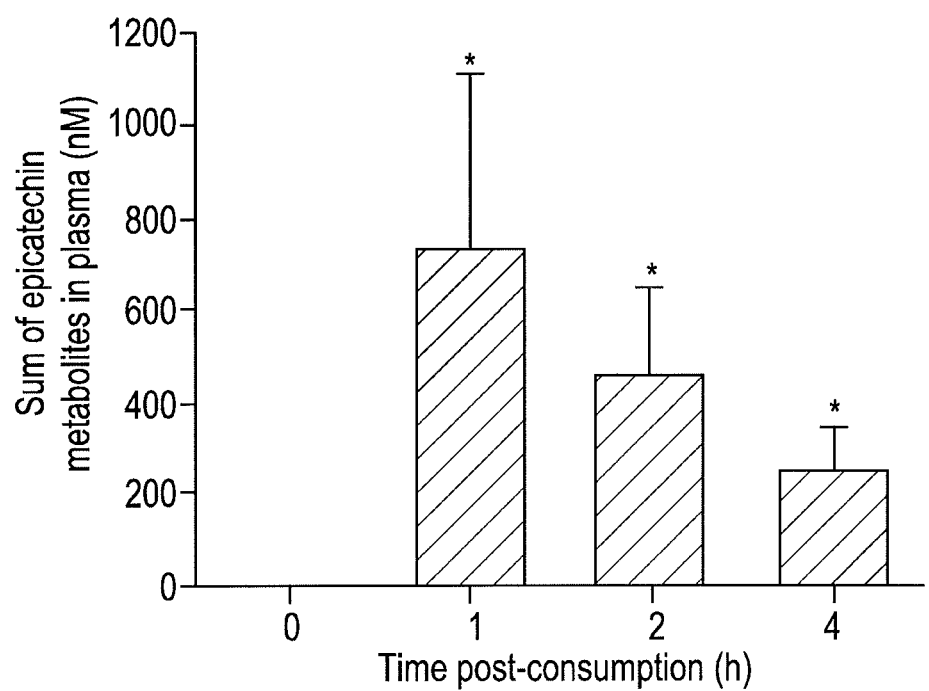
FIG. 2 shows the average levels of epicatechin metabolites detected in blood plasma at 0, 1, 2 and 4 hours after ingestion of a composition of the present subject matter in the biological study according to FIG. 1.
Figure 3:
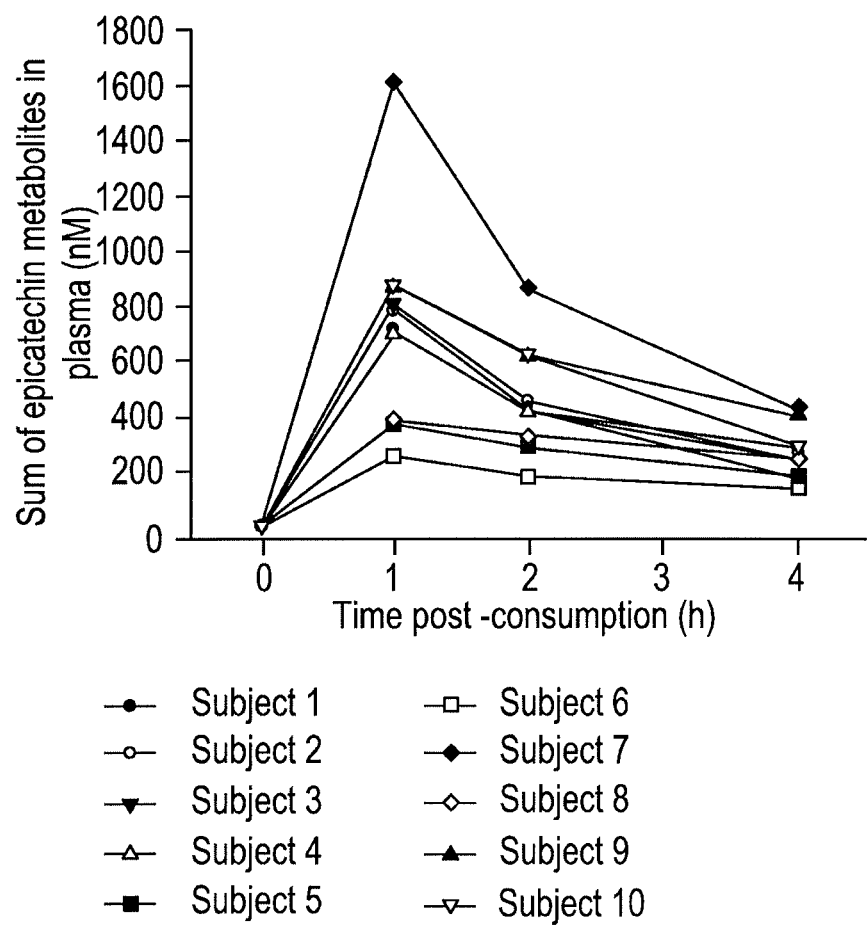
FIG. 3 shows the levels of epicatechin metabolites detected in blood plasma at 0, 1, 2 and 4 hours after ingestion of a composition of the present subject matter for each of ten subjects.
Figure 4A:
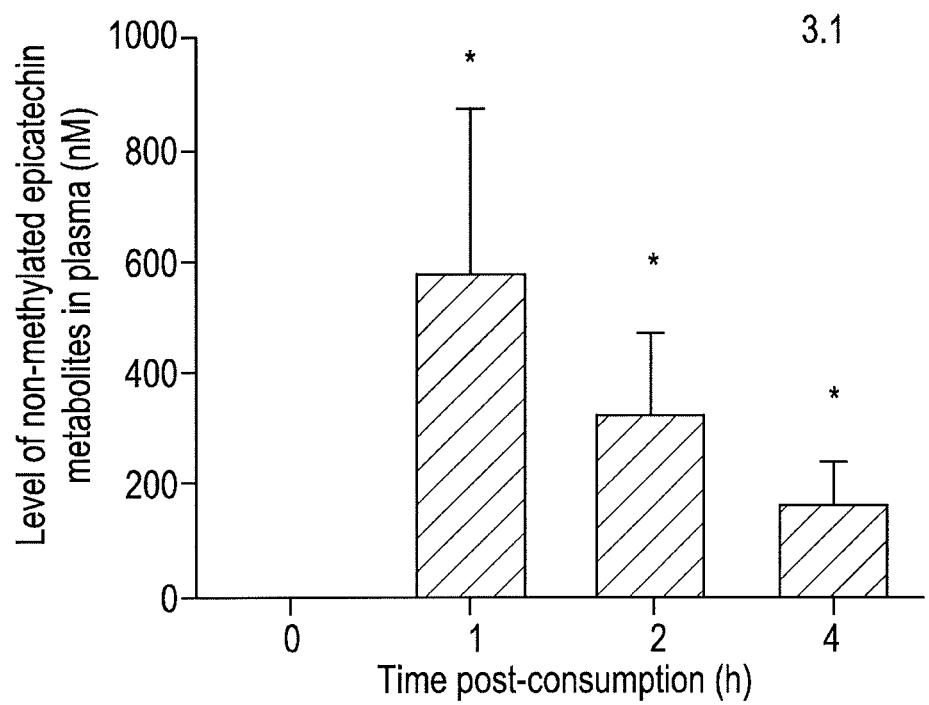
FIG. 4A shows the levels of non-methylated epicatechin metabolite in blood plasma at 0, 1, 2 and 4 hours after ingestion of a composition of the present invention.
Figure 4B:
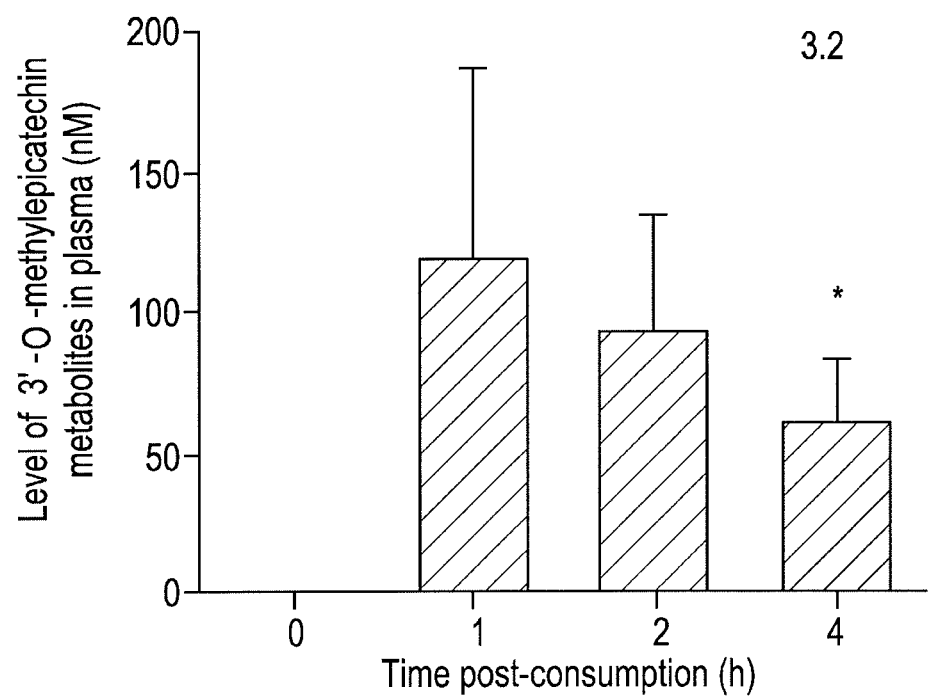
FIG. 4B shows the levels of 3'-O-methylepicatechin metabolite in blood plasma at 0, 1, 2 and 4 hours after ingestion of a composition of the present invention.
Figure 4C:
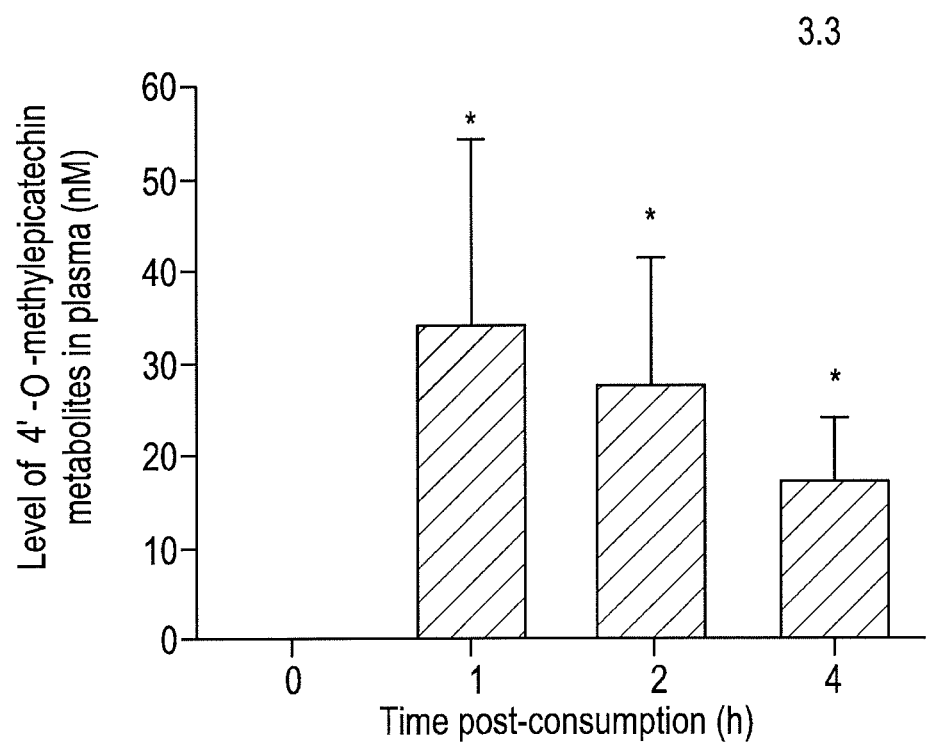
FIG. 4C shows the levels of 4'-O-methylepicatechin metabolite in blood plasma at 0, 1, 2 and 4 hours after ingestion of a composition of the present invention.
Figure 5:
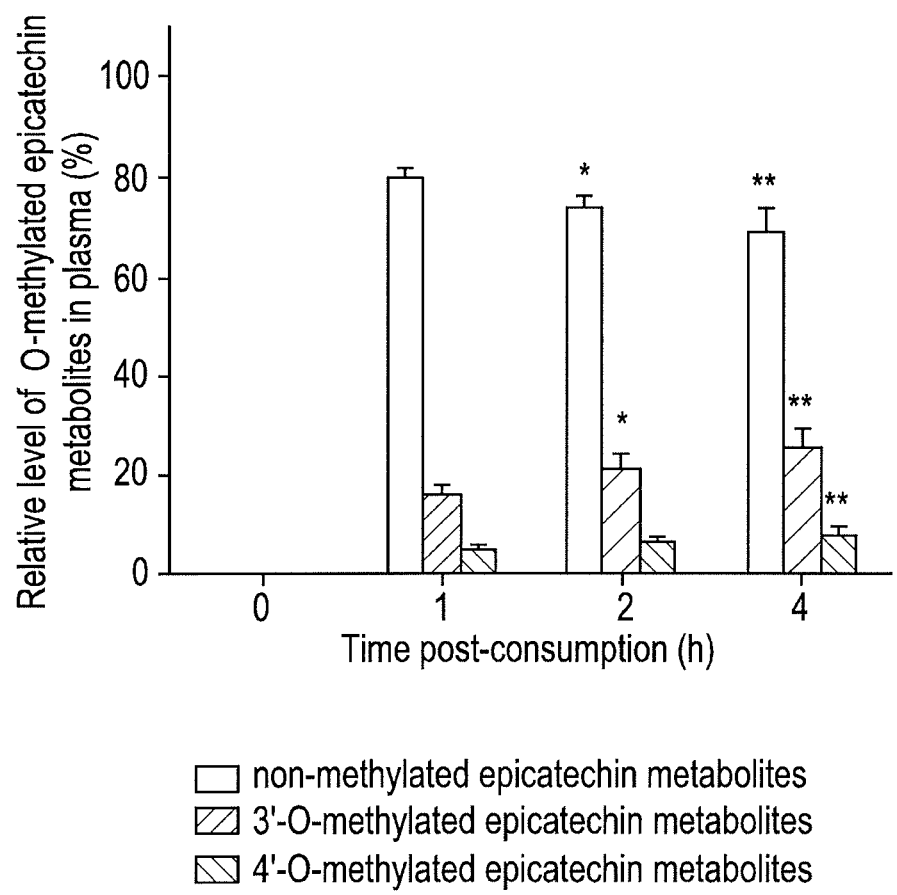
FIG. 5 shows the relative levels of non-methylated epicatechin, 3'-O-methylepicatechin and 4'-O-methylepicatechin metabolites in blood plasma at 0, 1, 2 and 4 hours after ingestion of a composition of the present invention.

Cocoa extracts comprising cocoa polyphenols are naturally bitter and astringent. Compositions containing a cocoa extract comprising cocoa polyphenols typically have been limited to chocolate-flavored compositions such as a cocoa beverage. Further, non-chocolate flavored compositions containing a cocoa extract comprising cocoa polyphenols have exhibited poor palatability due to the pronounced bitterness and astringency of the extract. Therefore, it would be advantageous to provide a non-chocolate flavored composition comprising a cocoa extract comprising cocoa polyphenols that is palatable. This would expand the useful application of cocoa polyphenols.

Cocoa extracts comprising cocoa polyphenols typically impart a purple to brown color when added to water. While the coloring is natural, it may not be appealing to those ingesting the composition containing the cocoa extract. Therefore, it would be advantageous to provide a composition comprising a cocoa extract comprising cocoa polyphenols that imparts an appealing color when added to water.

Given their extraction process, cocoa extracts comprising cocoa polyphenols may be hydrophobic and are therefore a difficult material to wet and, as a result, to disperse when added to water. Therefore, it would be advantageous to provide a composition comprising a cocoa extract comprising cocoa polyphenols that is more readily dispersed when added to water.

Further, tests have shown that ingestion of cocoa polyphenols in cocoa products typically result in a peak plasma concentration of the resulting metabolites often in about two hours post consumption (See Schroeter et al., (−)-Epicatechin mediates beneficial effects of the flavanol-rich cocoa on vascular functions in humans", PNAS, Vol. 103, No. 4, January 2006, pp. 1024-1029.) It would be advantageous to at least achieve similar absorption under the beverage conditions described herein.

The term "cocoa extract" refers to the solvent-derived extracts containing cocoa polyphenols (catechin, epicatechin and/or procyanidins) that can be prepared by solvent extracting cocoa beans, cocoa nibs, or non-defatted, partially or fully defatted cocoa solids (e.g. cocoa cake and cocoa powder) prepared from cocoa beans or cocoa nibs. For example, see U.S. Pat. No. 5,554,645 to Romanczyk; U.S. Pat. No. 6,015,913 (Kealey et al.) issued Jan. 18, 2000; and U.S. Pat. No. 6,312,753 (Kealey et al.) issued Nov. 6, 2001, the relevant disclosures of which (pertaining to cocoa extracts and extraction processes) are incorporated herein by reference. As a person of skill in the art can readily appreciate, depending on the solvent used for extraction (e.g. aqueous acetone) cocoa extract may be hydrophobic. Further, as is known to persons of skill in the art, that cocoa extract (which can be in powdered form) is a different material from cocoa powder prepared during traditional cocoa bean processing for cocoa beverage and chocolate manufacturing. For a description of traditional cocoa processing, see, for example, Industrial Chocolate Manufacture and Use, 3$^{rd}$, ed, Ed S. T. Beckett, Blackwell Publishing 1999. Additionally, in the case that an acid is used in the extraction process, it is intended that the resulting cocoa extract will be still combined with an edible acid as described herein, i.e., any remaining acid in said cocoa extract would not be considered as part of the edible acid component of the composition of the present invention.

The term "cocoa flavanols" refers to the flavan-3-ol monomers catechin and epicatechin. The monomers include (+)-catechin and (−)-epicatechin and their respective epimers (e.g., (+)-epicatechin and (−)-catechin) and derivatives thereof including metabolites thereof (e.g. see Example 2 for description of metabolites). As a person of skill in the art can appreciate, unlike tea, cocoa does not contain gallated and/or galloylated flavanols, thus the term "cocoa flavanols" does not include catechin gallate, epicatechin gallate, epigallocatechin, epigallocatechin gallate or the like.

The term "cocoa procyanidin" refers to, naturally occurring or synthetically derived oligomers of catechin and/or epicatechin.

Any reference to "cocoa polyphenols" should be understood to comprise cocoa flavanols and/or cocoa procyanidins.

The present compositions typically do not contain tea, wine, grape seed or pine bark-derived polyphenol compounds and/or extracts.

Also within the scope of the invention are the compositions comprising at least one of the flavanols having the formula "A" and the procyanidins having the formula "A$_n$" where n is an integer from 2 to 18 and higher. "A" has the formula:

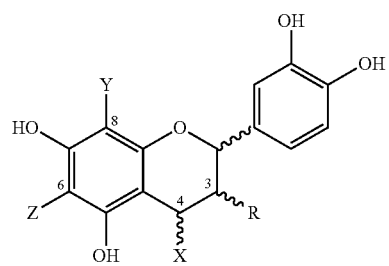

where R is 3-(α)-OH, 3-(β)-OH, 3-(α)-O-saccharide, 3-(β)-O-saccharide, 3-(α)-O—C(O)—R$^1$, or 3-(β)-O—C(O)—R$^1$; where bonding between adjacent monomers takes place at positions 4 and 6 or 4 and 8; where a bond to a monomer in position 4 has alpha or beta stereochemistry; where X, Y, and Z are selected from the group consisting of A, hydrogen, and a saccharide moiety, with the proviso that as to at least one terminal monomer, bonding of the adjacent monomer thereto is at position 4 and optionally Y=Z=hydrogen; and where the saccharide moiety is a mono- or di-saccharide moiety which may be optionally substituted with a phenolic moiety;

where R$^1$ may be an aryl or heteroaryl moiety optionally substituted with at least one hydroxy group; and salts, derivatives, and oxidation products thereof. Advantageously, the saccharide moiety is derived from the group consisting of glucose, xylose, rhamnose, and arabinose. The saccharide moiety and any or all of R, X, Y, and Z may optionally be substituted at any position with a phenolic moiety via an ester bond. The phenolic moiety is selected from the group consisting of caffeic, cinnamic, coumaric, ferulic, gallic, hydroxybenzoic, and sinapic acids.

In certain embodiments, the composition comprises at least one of the above compounds wherein R is 3-(α)-OH and/or 3-(β)-OH.

The term "composition" includes, but is not limited to, dietary supplements, beverages and beverage mixes.

The term "carrier" includes, but is not limited to, any materials known in the art including but not limited to any powder, liquid, gel, solubilizer, or binder, which is nontoxic and which does not interact with other components of the composition in a deleterious manner. Preferred carriers include, but are not limited to, maltodextrin, gum arabic, starch, microcrystalline cellulose, hydroxypropyl methylcellulose, and mixtures thereof. In certain embodiments, the carrier is maltodextrin and/or the carrier that is used is taste and/or astringency neutral, i.e., it has no effect on palatability including astringency of the resulting beverage.

The term "astringent" refers to a tactile sensation perceived as dryness, puckering and/or roughness in the oral cavity. Perception of astringency has a slow onset and is characterized by a long persistence; it may not be instantaneous but may require time for development. Although many compounds elicit an astringent sensation, astringency is chemically defined as the ability to precipitate proteins. A person of skill in the art will know how to assess and/or measure the astringency. For example, methods of sensory evaluation for assessment of characteristics such as bitterness, astringency, etc. are known in the field and practiced for example, as per recommendations and guidelines of the International Standard (ISO), and recognized bodies such as The American Society for Testing and Materials (ASTM). See also: Hanna Peleg et al., Bitterness and astringency of flavan-3-ol monomers, dimers and trimers, Journal of the Science of Food and Agriculture 79:1123-1128 (1999).

As used herein, the term "palatable" means that the composition such as a beverage has an agreeable or pleasant taste upon consumption both vis-à-vis the sense of taste and tactile sensation, for example, "palatable" means that elements of bitterness and astringency are in balance with the rest of the composition (i.e., in balance with sweetness and sourness) (bitterness, astringency and aftertaste are properties, as a person of skill in the art can appreciate, associated with cocoa extract); "palatable composition" also means that the presence of cocoa extract, or cocoa flavors, cannot be readily perceived therein. A hedonic scale is routinely used in the food science art to assess the palatability of food compositions and may be used herein as shown is Example 7 (see test results and citation therein). The hedonic scale that has been most widely used, for example, is a 9-point scale in which a person rates their preference for food, ranging from "extremely dislike" to "extremely like" with the midpoint of 5 being neither like nor dislike. Thus, a composition of the invention is "palatable" if a person rates a composition as at least 5 and above, e.g. 6 and above. Referring to Example 7, a 7-point hedonic scale may also be used.

The term "shelf-stable" refers to a product stored under ambient temperature and humidity conditions and, if the package integrity is maintained during storage, shipping, display at retail, and in the home, will not spoil or become unsafe throughout the manufacturer's specified shelf-life.

The term "water soluble composition" is intended to mean the same as "water dispersible composition" and may also be referred to as "water soluble/dispersible composition." As a person of skill in the art can appreciate, the dry powder compositions described herein contain some ingredients that are water soluble (e.g. edible acid) and some that are dispersible in water (e.g. cocoa extract particle).

Thus, the present invention is directed to a beverage such as a palatable beverage and a dry drink mix for the preparation thereof comprising an edible acid and additionally a cocoa extract comprising one or more cocoa polyphenols. In some embodiments, the beverage and the mix may comprise a sweetener such as sucralose and/or a carrier such as maltodextrin. A range of maltodextrins may be used, for example corn based DE 10.

In another embodiment, the present subject matter is directed to a non-chocolate flavored water soluble/dispersible composition comprising a sweetener such as sucralose, edible acid, a cocoa extract comprising one or more cocoa polyphenols and a carrier such as maltodextrin. The composition may further comprise a fruit flavor. In further embodiments, the non-chocolate flavored water soluble/dispersible composition excludes lecithin and/or taste and/or astringency masking agents such as for example quinic acid and/or pectin.

As used herein, the term "non-chocolate flavored composition" means that the composition has no readily perceivable chocolate or cocoa flavor even though the extracts and compounds used in the composition are derived from cocoa, i.e., the term "non-chocolate flavored" is intended to mean the same as "non-cocoa flavored"—the "non-chocolate flavored compositions" are thus unlike the compositions containing cocoa powder which compositions have cocoa/chocolate flavor.

In certain embodiments, the compositions described herein are non-proteinaceous compositions. The term "non-proteinaceous composition" means a composition that does not contain protein such as for example isolated dairy or soy proteins, milk powder, and/or soy powder. In some other embodiments, the composition of the invention may contain protein (e.g. whey protein or hydrolysate) and/or an amino acid arginine. In other embodiments, the composition may contain at least one amino acid other than glutamic acid.

In certain embodiments, the composition may be a free-flowing powder having particle sizes and distribution described herein.

The composition of the present subject matter contains an edible acid. Acceptable edible acids include, but are not limited to, citric acid, tartaric acid, lactic acid, ascorbic acid, fumaric acid, phosphoric acid, malic acid and combinations thereof. In certain embodiments, the compositions contain citric, tartaric or malic acid powders or any combination thereof, for example a combination of citric and malic acid (exemplary compositions are shown in Example 1). As a person of skill in the art can appreciate, ascorbic acid (Vit C) is added in accordance with the U.S. Recommended Daily Intakes (RDI) requirements, e.g. to provide up to 100% of the RDI and should not be used in large amounts due to potential side effects. Typically, quinic acid and oxalic acid are not contemplated for use in the invention.

In some embodiments, the amount of the acid (e.g. citric acid) in the dry mix composition is eighteen w/w percent (18% w/w) and above, for example, up to forty w/w percent (40% w/w), e.g. between thirty and forty w/w percent (30 to 40% w/w) or between eighteen and twenty five w/w percent (18 to 25% w/w). A person of skill in the art can optimize the acid amount and particularly the upper acid amount depending on the resulting beverage flavor, for example, too high of an acid content may result in a beverage too sour for consumption.

Advantages of decreasing the pH include reduction in or balance of the bitterness and astringency of the cocoa extract, providing a natural red color to the composition, and providing stability for the cocoa polyphenols in the composition. For purposes of this disclosure, "natural color" is as defined below.

The addition of an edible acid to the composition serves multiple purposes; it increases the wettability and dispersibility of the composition and decreases the pH of the composition when dispersed in water. The presence of an edible acid also provides for a reduction in the bitterness and astringency of the composition so as to make the composition palatable. The dryness, puckering and roughness throughout the oral cavity associated with the bitterness and astringency of the cocoa extract comprising cocoa polyphenol is greatly reduced by the presence of the edible acid.

The cocoa extract comprising cocoa polyphenols in the presence of an edible acid provides a more appealing natural red to maroon color for the composition when added to water (maroon color being more apparent than red color with the increasing amounts of cocoa extract). Thus, a composition of the invention may be a dry powder mix red/maroon in color. As used herein, "natural color" means that the color is intrinsic to (derived from) the cocoa extract under the acidic pH, i.e., due to the presence of the acid component of the drink and not achieved by purposefully changing the color by adding coloring agents. While coloring agents may be added to the compositions described herein, such coloring agents (e.g. Red 40, carmine) are not necessary and are preferably excluded from the compositions described herein. This is advantageous since certain food colorings may cause allergies or are for other reasons not appealing to consumers. Thus, compositions, including dry drink mix compositions, without food coloring agents are within the scope of the invention. As used herein, the term "food coloring agent" is as defined by the US Food and Drug Administration but expressly excludes fruit flavors. The compositions of the invention may thus contain fruit flavors.

One of the advantages of the compositions of the present invention is their increased wetting. In this respect, the edible acid increases wetting and provides improved sinkability of the composition when added to a liquid, for example water. The improved wetting and sinkability provides for a more rapid dissolution/dispersion of the composition in the liquid. Achieving these properties is challenging for compositions containing cocoa extract as described below.

Cocoa extract comprising cocoa polyphenols may, by nature of its extraction, be hydrophobic. Therefore, the wettability of such an extract is rather poor. As a result, it would be expected that an emulsifier such as lecithin, a wetting agent, would be required to render a composition which has an acceptable wettability and consequently acceptable dispersibility. As a person of skill in the art knows, lecithin is used in the context of cocoa powder-based drink mixes where it is essential for fast wetting and dispersion of cocoa powder when added to a liquid—in the absence of lecithin, cocoa powder can remain on the surface of the liquid for prolonged, and unacceptable periods of time (up to an hour). Some powders form wet crusts or lumps when added to water, which in turn creates a barrier preventing the inside of a lump to wet and hence the lump floats, i.e., it does not sink and therefore the powder is difficult to disperse. As noted above, increasing wettability allows the particles to be surrounded by water which provides for a more rapid sinking and thus dissolution/dispersion of a powder in a liquid. Regarding cocoa extracts that are hydrophobic, it was expected that the compositions containing such extracts would require the presence of lecithin. Surprisingly, however, no emulsifier, such as lecithin, is required to agglomerate and disperse the hydrophobic cocoa extract comprising cocoa polyphenols (see Example 4). Thus, compositions without an emulsifier (e.g. lecithin), for example, prepared by agglomeration of cocoa extract, an edible acid and a carrier (e.g. maltodextrin) without an emulsifier (e.g. lecithin) are within the scope of the invention.

Further, a sweetener is added to the composition to provide a balance with the edible acid. The combination of a sweetener such as sucralose, ace K or combinations thereof, with the edible acid provides a palatable composition with masked or reduced bitterness and astringency typically associated with cocoa related products without imparting an unsatisfactory after-taste.

Compositions of the present subject matter, when added to a liquid such as water have a titratable acidity value of from about 0.2% to about 0.75% (as citric acid). Titratable acidity of a solution is well known in the food science art and is measured by reacting the organic acid present, such as citric acid, with a base, such as sodium hydroxide (NaOH), to a chosen end point, close to neutrality, as indicated by an acid sensitive color indicator or a pre-determined pH. The titratable acidity is expressed as a percentage of the acid of interest, such as tartaric acid in grapes, lactic acid in milk or citric acid in lemon juice. Due to variation in buffering capacity of organic acids, there is no direct correlation between titratable acidity and pH. However, higher acid levels in beverages are often associated with lower pH values and vice versa.

The composition of the invention which is a beverage comprising water and the water soluble/dispersible composition described herein (e.g. dry drink mix, free-flowing powdered composition) has a pH less than about 5, for example, less than about 4, for example between about 2 to about 5, or between about 2 to about 4, or between 2 to about 3 or between 2.6 and 3. In certain embodiments, the pH of the beverage may be about 2.8.

The composition of the invention may comprise cocoa extract comprising epicatechin, catechin and procyanidin oligomers 2-10 (i.e., profile 1-10). In certain embodiments, the cocoa extract comprises epicatechin and/or any one of the oligomers 2-10 and/or combinations thereof.

The composition of the present subject matter has a total flavanol content (including monomers and oligomers) of at least about 100 milligrams per serving (i.e., per unit of the product) to provide the health benefits associated with cocoa polyphenols and no more than about 1000 mg per serving for the composition to remain palatable. The total flavanol content may be, for example, from at least about 200 to about 1000 milligrams per serving, or from at least about 300 to about 750 milligrams per serving, or from at least about 300 to about 525 milligrams per serving, or at least about 350 milligrams per serving of the composition. As shown in the examples, the serving size of the dry mix composition may be between six and seven grams. In certain embodiments, the composition may contain at least 5 mg/g (−)-epicatechin and/or at least 53 mg/g total epicatechin, catechin and procyanidin oligomers 2 to 10. The cocoa polyphenol content of the composition is measured by the method described in "Method performance and multi-laboratory assessment of a normal phase high pressure liquid chromatography-fluorescence detection method for the quantitation of flavanols and procyanidins in cocoa and chocolate containing samples," Rebecca J. Robbins, Jadwiga Leonczak, J. Christopher Johnson, Julia Li, Catherine Kwik-Uribe, Ronald L. Prior, and Liwei Gu, Journal of Chromoatography A, 1216 (2009) 4831-4840.

The cocoa extract used in the compositions of the present subject matter can be milled to reduce the particle size of the extract. The milled cocoa extract typically contains at least about 300 milligrams of cocoa polyphenols (profile 1-10, flavanols and procyanidin oligomers), for example, about 300 to about 700 milligrams, or at least about 400 milligrams, or about 400 to about 600 milligrams, or about 400 to about 500 milligrams, per gram of the milled cocoa extract. The cocoa extract which is present in compositions of the present subject matter may have a reduced particle size of about 75 microns or less, preferably about 30 microns or less, more preferably about 20 microns or less, and most preferably about 10 microns or less. This reduced particle size provides for a further reduction in the astringency, which in turn provides for a more palatable composition.

However, smaller (fine) particle size of the dry powdered drink composition (e.g. after cocoa extract and other ingredients are agglomerated with the acid particles) may adversely affect wettability and then sinkability of the drink mix composition when added to water, hence the desired particle size in the composition of the present invention (e.g. particle size after agglomeration) was determined experimentally vis-à-vis a combination of other factors (e.g. acid content) to arrive at palatable beverage(s) described herein when the dry, powdered composition is mixed with water.

The compositions of the present invention, in certain embodiments, should meet the following dispersibility test. As used herein, the phrase "wherein the water soluble composition meets the Predetermined Dispersibility Test" means that the composition satisfies the following requirements following this procedure. Powdered mix product (between 6-7 g) must wet such that there is no clumped powder or powder crust left on the surface visible to the eye within ten (10) seconds after being added to a 16 fl. oz. (½ liter) bottle of cold water (between 4° C. and 10° C., 38-50 F). The product should sink, towards the bottom of the bottle, almost concomitantly. After wetting is assessed, the bottle is then shaken for twenty (20) seconds, rested for ten (10) seconds, shaken for another ten (10) seconds and then assessed for the absence or presence of visible powder sedimented at the bottom. The drink is then poured through a mesh size 40 according to the US Sieve Series, which corresponds to 0.420 mm (420 micron) opening on the mesh—no clumps of multiple particles should be found on the screen. The mesh number system is a measure of how many openings exist per linear inch in a screen. The values of US Sieve Series are known to persons of skill in the art and can be found, for example, at http://www.azom.com/details.asp?ArticleID=1417. US Sieve Series is also as defined by ASTM standards as known by persons of skill in the art.

Particle size distribution has an impact on dispersibility of the dry drink composition with water. Examples of drink mix compositions of the invention vis-à-vis the particle size are as follows; the particle size is expressed as w/w percentage throughout this disclosure and claims. The amount of particles larger than 841 microns (i.e., remaining on the US Sieve Series mesh size 20) is no more than about five percent (5%), e.g. no more than three percent (3%) or e.g. no more than one percent (1%). The amount of particles of 74 microns or smaller (i.e., falling through US Sieve Series mesh size 200) is no more than about five or four percent (5% or 4%), e.g. no more than three percent (3%) or e.g. no more than one percent (1%). With respect to particle size between 421 and 841 microns (i.e., particles remaining on US Sieve Series mesh size 40 after falling through mesh size 20), in some examples of the composition, this particle size is in the amount of no more that about forty percent (40%) or no more than about twenty percent (20%) depending on the acid level of the composition, or no more than in the range between twenty and forty percent (20 to 40%). Typically, the amount of particles in the range between 251 and 420 microns (i.e., particles remaining on US Sieve Series mesh size 60 and falling through mesh size 40) may be in the range of thirty to fifty percent (30-50%). Compositions with any combination of particle sizes exemplified above are within the scope of additional embodiments of the invention.

In some examples of the composition, the above-mentioned particle size may be adjusted depending on the acid content of the composition. For example, for a composition comprising twenty six percent (26%) and above or thirty percent (30%) and above acid (e.g. citric acid), the particle size between 421 and 841 microns (i.e., particles remaining on US Sieve Series mesh size 40 after falling through mesh size 20) is in the amount of no more that about forty percent (40%). For a composition comprising eighteen (18%) and up to twenty five w/w percent (25%) of the acid (e.g. citric acid), e.g. twenty w/w percent (20%) and up to twenty five w/w percent (25%) of the acid (e.g. citric acid), the particle size between 421 and 841 microns (i.e., particles remaining on US Sieve Series mesh size 40 after falling through mesh size 20) is no more than twenty w/w percent (20%). The wetting, sinkability and dispersibility of a composition comprising below 18% acid is less desirable.

The composition may have additional elements such as sweeteners, bulking agents, flow agents, natural flavors, vitamins, minerals, buffering agents and other materials.

Suitable sweeteners (nutritive and non-nutritive) may include those typically used in foods and include, but are not limited to, sucrose (e.g., from cane or beet), dextrose, fructose, lactose, maltose, glucose syrup or the solids thereof, corn syrup or the solids thereof, invert sugar, hydrolyzed lactose, honey, maple sugar, brown sugar, molasses, high potency sweeteners, sugar alcohols (polyols), bulking agents, or combinations thereof. In the art, the following are recognized as high potency sweeteners—aspartame, cyclamates, saccharin, acesulfame, neo-hesperidin dihydrochalcone, sucralose, alitame, stevia sweeteners, glycyrrhizin, thaumatin, acesulfame-K, and mixtures thereof. Examples of sugar alcohols include those typically used in the art and include, but are not limited to, sorbitol, mannitol, xylitol, maltitol, isomalt, and lactitol, and the like. Particularly preferred sweeteners include sucrose and sucralose and combinations of sucralose and ace K. For the purposes of the present invention, an advantageous sweetener both provides sweetness and masks bitterness and astringency (i.e., it acts as a bitterness/astringency blocker) as is the case with sucralose. Aspartame is not used in certain embodiments of the invention due its inability to provide sweetness (without a marked aftertaste) in the presence of cocoa extract (see Example 3) when compared under the same conditions with, for example, sucralose.

The composition may also contain bulking agents such as those typically used in combination with high potency sweeteners. The "bulking agents" include those typically used in foods and include, but are not limited to, polydextrose, cellulose and its derivatives, maltodextrin and gum arabic. In certain embodiments, the bulking agent is neutral vis-à-vis the taste and astringency of the composition, i.e., it does not affect these properties.

The composition may also contain a carrier, such as maltodextrin, gum arabic, starch, microcrystalline cellulose, hydroxypropyl methylcellulose or mixtures thereof. In certain embodiments, the carrier is neutral vis-à-vis the taste and astringency of the composition, i.e., it does not affect these properties.

The composition may also contain flow agents, including but not limited to silicon dioxide and magnesium oxide. In certain embodiments, the flow agent is neutral vis-à-vis the taste and astringency of the composition, i.e., it does not affect these properties.

The composition or beverage may also contain flavors including but not limited to natural or artificial fruit flavors, vanillin, spices, and naturally expressed citrus or spice oils, and combinations thereof. Through experimentation certain flavors are preferred such as berry, citrus (e.g. grapefruit), pineapple or plum flavors.

Examples of the compositions of the invention are as follows. A water soluble/dispersible composition (e.g. non-chocolate flavored composition) comprising cocoa extract, edible acid and sucralose; in such composition cocoa extract may comprise catechin, epicatechin and procyanidin oligomers 2-10 or at least one compound thereof, the amount of the total cocoa polyphenol per unit of the composition may be at least 53 mg/g of catechin, epicatechin and oligomers 2 to 10 with at least 5 mg/g of (−)-epicatechin; the edible acid may be selected from citric, malic and/or tartaric acid; the amount of the acid may be at least 18 w/w % of the dry composition and the amount of the particle size ranges may be no more than 5% of particles larger than 841 microns, no more than 4% of particles of 74 microns or smaller, no more than between 20% to 40% particles ranging between 420 microns and 840 microns.

In other examples of the composition, the composition (e.g. dry drink mix composition) comprises cocoa extract, an edible acid and a sweetener, wherein the edible acid to cocoa extract ratio is 0.8 and above. An edible acid may be in the amount of at least 18 w/w percent in such a composition.

In certain other embodiments, the water soluble composition (e.g. non-chocolate flavored composition) consists essentially of cocoa extract, edible acid (e.g. citric acid), non-nutritive sweetener (e.g. sucralose), carrier (e.g. maltodextrin) and fruit flavor. For purposes of the embodiments described in the present paragraph, the transitional phrase "consisting essentially of" means that the composition may contain, in addition to the listed ingredients, other ingredients that do not affect the palatability including bitterness and astringency of the beverage.

Administration of the composition comprising the cocoa extract comprising cocoa polyphenols is preferably by oral administration.

The invention is further described in the following non-limiting examples.

EXAMPLES

Example 1 Beverage Mix

The present beverage mix can be prepared, for example, by adding the components of the beverage mix in any order.

| Ingredient | (g)/Serving | % (w/w) |
|---|---|---|
| Maltodextrin DE10 | 2.622 | 39.73 |
| Citric acid fine granular, anhydrous | 2.100 | 31.82 |
| Cocoa extract containing cocoa polyphenols at 440 mg/g | 0.880 | 13.33 |
| Grapefruit flavor | 0.600 | 9.09 |
| Tripotassium Citrate, monohydrate | 0.210 | 3.18 |
| Sucralose | 0.100 | 1.52 |
| Ascorbic acid (Vit C) | 0.075 | 1.14 |
| Silicon dioxide | 0.013 | 0.20 |
| | 6.600 | 100.00 |

The beverage mix was initially produced in ten pound (10 lbs.) batches with the percentages for each component specified above. Most of the maltodextrin DE-10 was placed in a bowl and combined with citric acid, ascorbic acid, cocoa extract micronized to a mean particle of less than 30 μm, flavor(s) and tripotassium citrate. This blend was then placed in an agglomerator. As the blend was fluidized with the help of hot air, it was concurrently sprayed with a solution of maltodextrin and sucralose. Silicon dioxide, an anti-caking agent, was added after agglomeration. The mix in an amount of 6.6 g was added to 500 mL of water producing an approximate pH of 2.8.

Example 2 Biological Study

Epicatechin metabolite levels in plasma were determined after the ingestion of the cocoa polyphenol beverage mix, as described in Example 1, by human subjects showing that epicatechin was absorbed from the beverage.

For this study, healthy male and female subjects [n=10, 6 male and 4 females] were recruited. The subjects were asked to follow a low-flavanol diet the day before and during the study day, and to fast for the last 12 h prior to the initialization of the study. On the study day, subjects ingested 250 ml of water to assure the same hydration level, followed 1 h later by the ingestion of the product.

The subjects ingested a cocoa polyphenol beverage containing 53 mg of flavanols [profile 1-10] per g of product measured using a procedure set forth above. The product was ingested in the form of a beverage that was prepared dissolving 6.6 g of the test material in 350 ml (12 oz) of water. Subjects were asked to ingest the product in less than 2 minutes. The total amount of flavanols [profile 1-10] administered in this drink was at least about 350 mg. According to the average weight of the volunteers, this amount of flavanols corresponded to an average dose of 5.1±0.9 mg of flavanols per kg of body weight.

Blood samples were collected from all subjects before and 1, 2 and 4 hours after product ingestion. See FIG. 1 for a sampling paradigm. Determination of epicatechin metabolite levels in plasma: non-methylated epicatechin, 3'-O-methylepicatechin and 4'-O-methylepicatechin were quantified in plasma samples after treatment with β-glucuronidase and sulfatases for 40 min at 37° C. The sum of epicatechin metabolites in plasma was calculated as the sum of the levels of non-methylated epicatechin, 3'-O-methylepicatechin and 4'-O-methylepicatechin metabolites.

As demonstrated in FIGS. 2 through 5 as well as Tables 1 and 2 below epicatechin metabolites in plasma were detected in blood samples collected prior to ingestion of the cocoa polyphenol beverage and 1, 2 and 4 hours after ingestion of the cocoa polyphenol beverage showing absorption upon administration of the beverage of the invention.

This study demonstrated that the ingestion of the cocoa polyphenols in an acidic matrix does lead to a significant increase in the plasma levels of epicatechin metabolites in humans.

TABLE 1

Detected plasma epicatechin in their non-methylated and O-methylated metabolites [in nM] following the ingestion of test product.

| Subject | time (h) | non-methylated epicatechin (nM) | 3'-O-methyl epicatechin (nM) | 4'-O-methyl epicatechin (nM) | Sum of flavanols metabolites (nM) |
|---|---|---|---|---|---|
| Subject 1 | 0 | 0 | 0 | 0 | 0 |
| | 1 | 562 | 101 | 36 | 700 |
| | 2 | 298 | 75 | 24 | 397 |
| | 4 | 158 | 45 | 16 | 218 |
| Subject 2 | 0 | 0 | 0 | 0 | 0 |
| | 1 | 621 | 127 | 27 | 775 |
| | 2 | 314 | 98 | 24 | 436 |
| | 4 | 160 | 52 | 15 | 227 |
| Subject 3 | 0 | 0 | 0 | 0 | 0 |
| | 1 | 642 | 117 | 35 | 794 |
| | 2 | 312 | 82 | 25 | 419 |
| | 4 | 88 | 43 | 14 | 145 |
| Subject 4 | 0 | 0 | 0 | 0 | 0 |
| | 1 | 537 | 121 | 35 | 693 |
| | 2 | 284 | 95 | 26 | 404 |
| | 4 | 187 | 54 | 18 | 259 |
| Subject 5 | 0 | 0 | 0 | 0 | 0 |
| | 1 | 281 | 69 | 15 | 365 |
| | 2 | 186 | 71 | 13 | 271 |
| | 4 | 102 | 49 | 10 | 162 |
| Subject 6 | 0 | 0 | 0 | 0 | 0 |
| | 1 | 194 | 38 | 10 | 243 |
| | 2 | 132 | 32 | 8 | 172 |
| | 4 | 82 | 24 | 5 | 111 |
| Subject 7 | 0 | 0 | 0 | 0 | 0 |
| | 1 | 1242 | 284 | 80 | 1606 |
| | 2 | 608 | 181 | 58 | 847 |
| | 4 | 271 | 107 | 27 | 405 |
| Subject 8 | 0 | 0 | 0 | 0 | 0 |
| | 1 | 301 | 52 | 21 | 373 |
| | 2 | 232 | 65 | 20 | 318 |
| | 4 | 141 | 61 | 17 | 219 |

TABLE 1-continued

Detected plasma epicatechin in their non-methylated and O-methylated metabolites [in nM] following the ingestion of test product.

| Subject | time (h) | non-methylated epicatechin (nM) | 3'-O-methyl epicatechin (nM) | 4'-O-methyl epicatechin (nM) | Sum of flavanols metabolites (nM) |
|---|---|---|---|---|---|
| Subject 9 | 0 | 0 | 0 | 0 | 0 |
| | 1 | 699 | 127 | 32 | 858 |
| | 2 | 459 | 113 | 31 | 604 |
| | 4 | 269 | 87 | 21 | 377 |
| Subject 10 | 0 | 0 | 0 | 0 | 0 |
| | 1 | 668 | 150 | 51 | 869 |
| | 2 | 442 | 124 | 40 | 606 |
| | 4 | 172 | 70 | 25 | 266 |

TABLE 2

Detected plasma epicatechin in their non-methylated and O-methylated metabolites [in %] following the ingestion of test product

| Subject | time (h) | non-methylated epicatechin (nM) | 3'-O-methyl epicatechin (nM) | 4'-O-methyl epicatechin (nM) |
|---|---|---|---|---|
| Subject 1 | 0 | 0 | 0 | 0 |
| | 1 | 80.4 | 14.5 | 5.1 |
| | 2 | 75.0 | 18.9 | 6.0 |
| | 4 | 72.2 | 20.6 | 7.2 |
| Subject 2 | 0 | 0 | 0 | 0 |
| | 1 | 80.2 | 16.4 | 3.4 |
| | 2 | 71.9 | 22.5 | 5.6 |
| | 4 | 70.4 | 22.8 | 6.8 |
| Subject 3 | 0 | 0 | 0 | 0 |
| | 1 | 80.8 | 14.8 | 4.4 |
| | 2 | 74.5 | 19.6 | 5.0 |
| | 4 | 60.9 | 29.8 | 9.4 |
| Subject 4 | 0 | 0 | 0 | 0 |
| | 1 | 77.5 | 17.5 | 5.0 |
| | 2 | 70.2 | 23.4 | 6.4 |
| | 4 | 72.3 | 20.7 | 7.0 |
| Subject 5 | 0 | 0 | 0 | 0 |
| | 1 | 77.1 | 18.8 | 4.1 |
| | 2 | 68.9 | 26.2 | 5.0 |
| | 4 | 63.2 | 30.6 | 6.2 |
| Subject 6 | 0 | 0 | 0 | 0 |
| | 1 | 80.0 | 15.8 | 4.2 |
| | 2 | 77.0 | 18.4 | 4.6 |
| | 4 | 73.8 | 21.3 | 4.9 |
| Subject 7 | 0 | 0 | 0 | 0 |
| | 1 | 77.4 | 17.7 | 5.0 |
| | 2 | 71.8 | 21.4 | 6.8 |
| | 4 | 67.1 | 26.3 | 6.6 |
| Subject 8 | 0 | 0 | 0 | 0 |
| | 1 | 80.6 | 13.9 | 5.5 |
| | 2 | 73.0 | 20.5 | 6.4 |
| | 4 | 64.5 | 27.6 | 7.9 |
| Subject 9 | 0 | 0 | 0 | 0 |
| | 1 | 81.4 | 14.8 | 3.8 |
| | 2 | 76.0 | 18.8 | 5.2 |
| | 4 | 71.3 | 23.0 | 5.6 |
| Subject 10 | 0 | 0 | 0 | 0 |
| | 1 | 76.9 | 17.3 | 5.9 |
| | 2 | 73.0 | 20.4 | 6.6 |
| | 4 | 64.6 | 26.2 | 9.2 |

Example 3 Palatability Testing with Sweeteners

In order to arrive at the palatable beverage of the invention, various sweeteners were tested. Several beverage mixes were prepared as described in Example 1 using the following test sweeteners: sucralose, aspartame, thaumatin (Talin®, Overseal Natural Ingredients, Ltd., United Kingdom), purified Rebiana (Crystalline Rebaudioside A, Cargill, Inc. Wayzata, Minn., USA) which were added in similar amounts (i.e., 40 mg/240 ml water) to test dry powder mixes. Of these it was determined, through sensory evaluation by a number of expert tasters (n=2), that sucralose provided the most desirable level of sweetness (in balance with sourness, bitterness and astringency with the least amount of aftertaste). In contrast, addition of aspartame and taumatin reduced astringency but failed to impart sweetness; and rebiana failed to reduce astringency and did not impart sweetness. In a separate experiment, a combination of sucralose and ace K (60:40) imparted sweetness and reduced bitterness and astringency.

Example 4 Dry Drink Mix Wettability Studies

Agglomerated samples of several test beverages were prepared to investigate the role, if any, of various drink ingredients such as the amount of acid, cocoa extract, maltodextrin, and various ratios thereof on the final properties of the beverage of the invention (e.g., wetting time, dispersibility, color, taste etc.). The cocoa extract was prepared by aqueous acetone extraction as described, for example, in U.S. Pat. No. 5,554,645 to Romanczyk. Ingredients were processed as described in Example 1. The wetting time was measured under "stress" conditions, i.e., using a "strong drink" with high amount of 20 g of drink formulations per 200 ml water (instead of 6.6 g in 500 mL). Results are reported in Table 3 and FIGS. 6A and 6B or were observed visually or by tasting and are described herein.

The amount of acid impacted color development, e.g. drinks got a darker hue as it transitioned from red to brown by increasing pH. It was determined that at least 18% w/w of acid was needed for palatable taste, reducing astringency and bitterness of cocoa extract.

Referring to Table 3, a composition containing 21.4% w/w of cocoa extract without acid and without lecithin had very poor wettability and required 180 seconds (3 minutes) to wet; in contrast, the composition with the same amount of cocoa extract, no acid but with lecithin required 8.9 seconds to wet (compare columns 5 and 6). Given the poor wettability of the cocoa extract (due to its intrinsic hydrophobicity), the addition of 1-2% lecithin was expected to be required in order to prepare a composition with acceptable wetting properties. Surprisingly, in the presence of citric acid, cocoa extract could be easily and quickly agglomerated rendering a product with good wettability (compare all acid containing samples with column 5). However, the amount of the acid (% w/w) affected wetting times and a trend was observed showing that a higher amount of acid (at constant cocoa extract content) resulted in lower wetting time; compare e.g. columns 7, 8 and 9, and columns 13 and 14. As a person of skill the art would appreciate, the amount of cocoa extract will also affects wetting time due to its hydrophobicity, and therefore the data in Table 3 were analyzed also taking the cocoa extract amount into consideration as further discussed below.

Figure 6A:
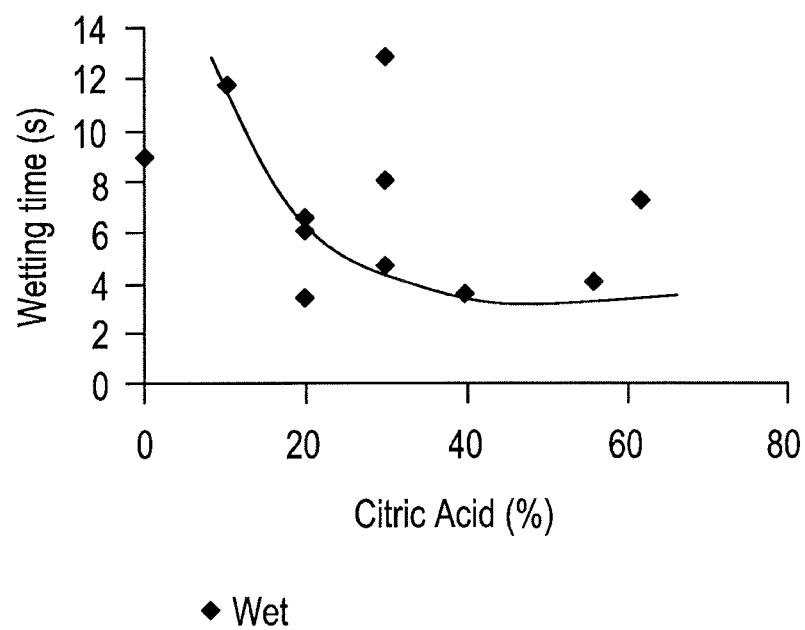
FIG. 6A shows wetting time trends of dry drink mix compositions as a function of citric acid content.
Figure 6B:
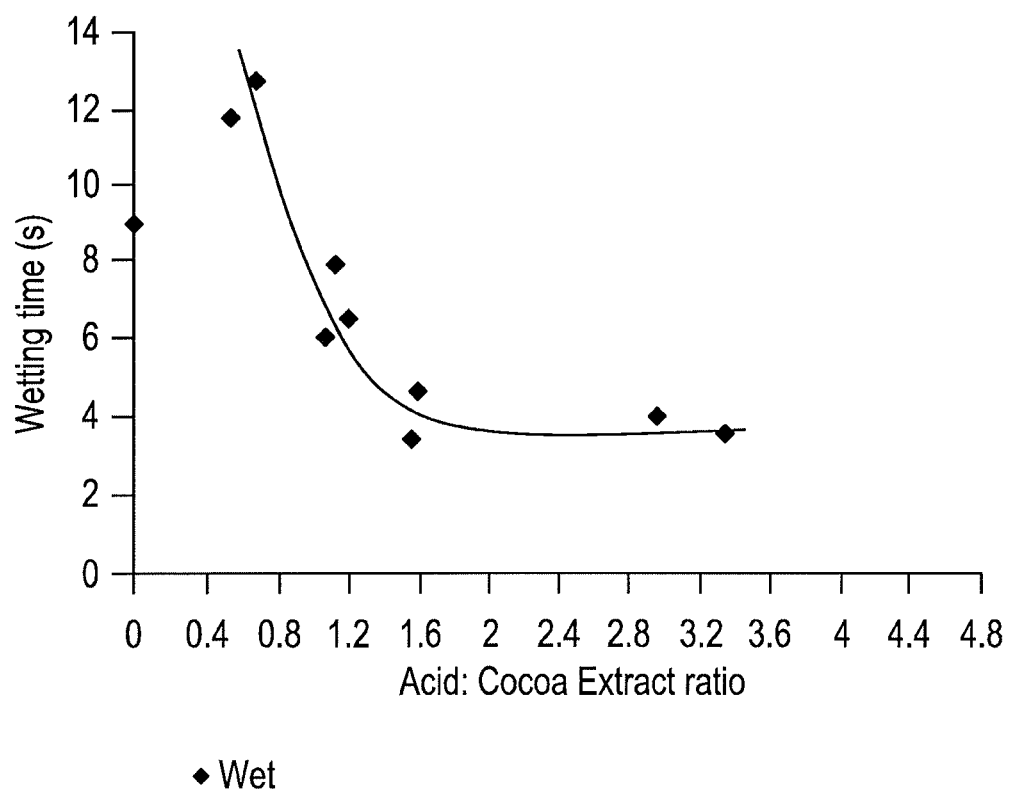
FIG. 6B shows wetting time trends of dry drink mix compositions as a function of acid to cocoa extract ratio.

The trends observed in the data of Table 3 are illustrated in FIGS. 6A and 6B, which plot data from Table 3. Because of its high value (180 seconds), Formulation 5 (no acid, no lecithin was not plotted); rather, the data point shown for zero percent acid is for a lecithin containing formulation. Referring to FIG. 6A, a trend of reducing wetting time with increasing amount of acid was observed. However, at any one particular acid content, the increasing amount of cocoa extract increased the wetting time—thus, the three formulations having 20% w/w/citric acid (Formulations in columns 2, 8 and 13 of Table 3) had different wetting times, the wetting time increasing with the amount of cocoa extract. Further referring to FIG. 6A, similar trend was observed for formulations having 30% w/w citric acid (Formulation in columns 10, 11, and 12 of Table 3)—the higher amount of cocoa extract, the longer the wetting time. The trend between the wetting time and the acid to cocoa extract ratio is further illustrated in FIG. 6B—the higher this ratio, the lower the wetting time. An acid to cocoa extract ratio of 0.8 and above trended towards lower wetting time (e.g. 10 seconds and below).

Figure 7:
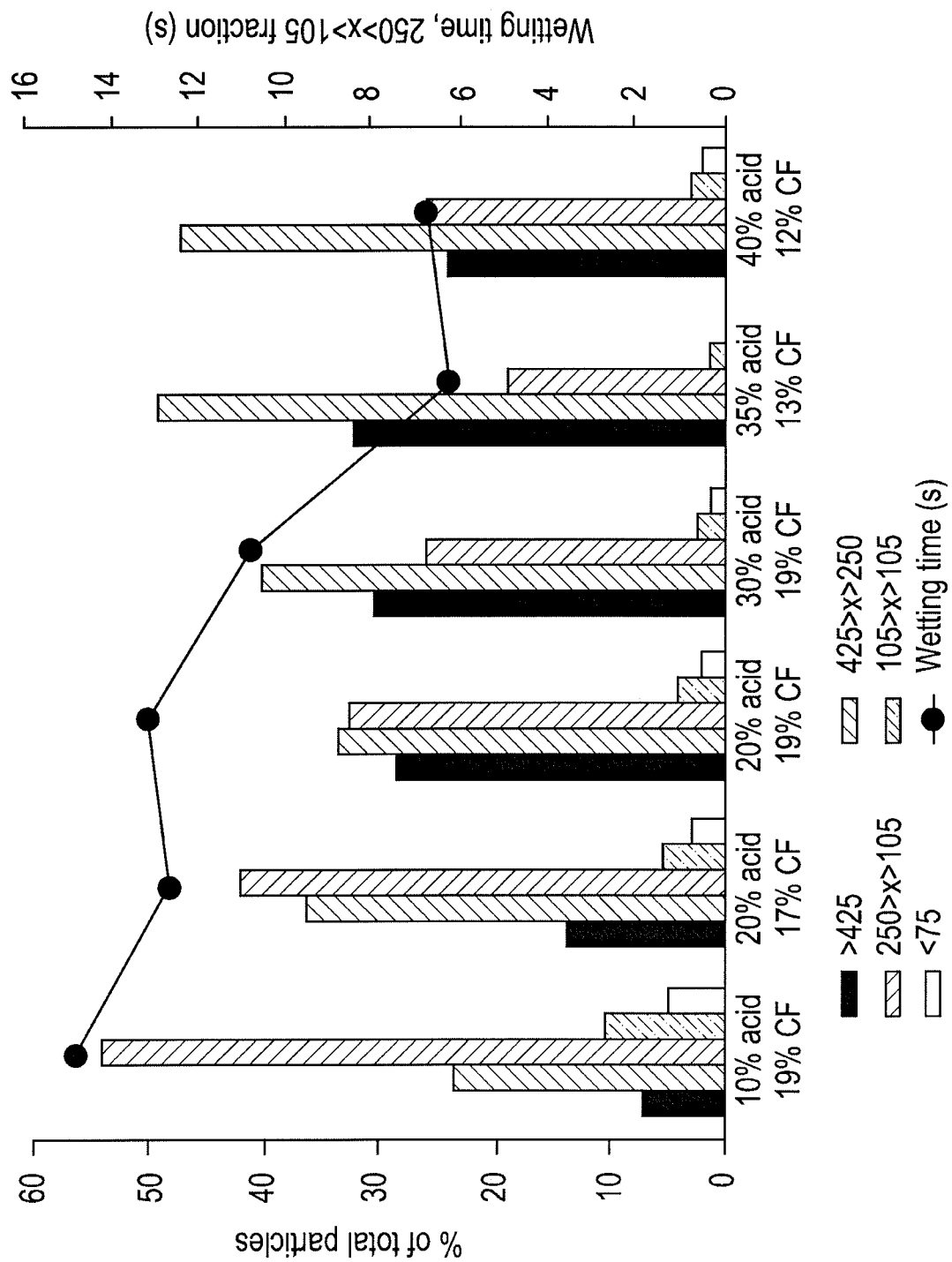
FIG. 7 shows particle size distribution of several dry drink mix compositions and wetting times for the 250>x>105 micron particle size fraction of these compositions. CF refers to cocoa extract.

Additional studies showed that malic acid and tartaric acid provided similar properties as those of citric-acid based powders. This is useful in terms of taste modulation as some fruit flavors can be better enhanced by substitution or combination of acids.

present specification. The data from this experiment are presented in Table 4 with some of the data graphically represented on FIG. 7.

The importance of particle size distribution in the final drink mix is illustrated, for example, by comparing column 5, Table 3, i.e., the drink formulation without any acid, which had poor wetting time of 180 seconds, with column 6, Table 4, i.e., a 250>x>105 microns fraction of a similar composition without acid, which had a wetting time of 10.6 seconds. Importantly, the no acid composition in Table 4, had about 7.5% w/w cocoa extract particles that were not agglomerated and these particles (referred to as "fines" due to their small size arising from cocoa extract micromilling) are hydrophobic and negatively affect the wetting and dispersion properties of the overall final drink mix composition

TABLE 3

Wetting Time and Density Tested vis-à-vis Acid, Maltodextrin and Cocoa Extract Content
TEST FORMULAS (% w/w)
Sample No:

| Ingredient | 1 35.8% acid | 2 20% acid | 3 61.5% acid | 4 No extract | 5 No acid | 6 No acid plus Lecithin | 7 10% acid | 8 20% acid | 9 40% acid | 10 30% acid Mdx/ Extract R 2.4 | 11 30% acid Mdx/ Extract R 1.4 | 12 30% acid Mdx/ Extract R 0.4 | 13 20% acid Extract 19%; Mdx 55% | 14 55.8% acid Extract 19%; Mdx 20% |
|---|---|---|---|---|---|---|---|---|---|---|---|---|---|---|
| Maltodextrin, Star-Dri 100 | 45.7 | 61.5 | 20.0 | 53.0 | 73.4 | 72.7 | 65.7 | 57.9 | 42.5 | 45.8 | 38.0 | 19.3 | 55.8 | 20.0 |
| Citric acid fine granular | 35.8 | 20.0 | 61.5 | 41.8 | 0.0 | 0.0 | 10.0 | 20.0 | 40.0 | 30.0 | 30.0 | 30.0 | 20.0 | 55.8 |
| Cocoa Extract (micromilled 450 mg polyphenol profile 1-10/g) | 13.3 | 13.3 | 13.3 | 0.0 | 21.4 | 21.2 | 19.2 | 16.9 | 12.3 | 19.0 | 26.8 | 45.5 | 19.0 | 19.0 |
| Sucralose | 1.7 | 1.7 | 1.7 | 1.7 | 1.7 | 1.7 | 1.7 | 1.7 | 1.7 | 1.7 | 1.7 | 1.7 | 1.7 | 1.7 |
| Tripotassium Citrate, 1 H$_2$O | 3.5 | 3.5 | 3.5 | 3.5 | 3.5 | 3.5 | 3.5 | 3.5 | 3.5 | 3.5 | 3.5 | 3.5 | 3.5 | 3.5 |
| Lecithin | 0.0 | 0.0 | 0.0 | 0.0 | 0.0 | 1 | 0.0 | 0.0 | 0.0 | 0.0 | 0.0 | 0.0 | 0.0 | 0.0 |
| maltodextrin/ cocoa extract ratio | 3.43 | 4.62 | 1.50 | N/A | 3.43 | 3.43 | 3.43 | 3.42 | 3.45 | 2.41 | 1.42 | 0.42 | | |
| Maltodextrin/ acid ratio | 1.27 | 3.08 | 0.33 | 1.27 | N/A | N/A | 6.57 | 2.90 | 1.06 | 1.53 | 1.27 | 0.64 | | |
| acid/cocoa extract ratio | 2.69 | 1.50 | 4.62 | N/A | 0.00 | 0.00 | 0.52 | 1.18 | 3.24 | 1.58 | 1.12 | 0.66 | | |
| Wetting time in sec (10 g in 200 mL) | | 3.5 | 7.12 | | 180.0 | 8.9 | 11.8 | 6.6 | 3.6 | 4.7 | 8.0 | 12.7 | 6.1 | 4 |
| Density (bulk) | | 0.554 | 0.418 | 0.40 | 0.47 | 0.45 | 0.48 | 0.46 | 0.52 | 0.46 | 0.49 | 0.60 | 0.446 | 0.552 |

Example 5 Particle Size Distribution and Wetting Times

Particle size distribution and wetting times for several beverage prototypes shown in Table 3 containing different levels of citric acid were also studied. The drink mix samples analyzed in this example belonged to the same batch as the samples of Example 4. In contrast to the results reported in Example 4 and Table 3, in which the wetting time of the entire drink formulation was measured, here, the wetting time of a particular fraction having particle size 250>x>105 microns was measured. This was done in order to determine the desirable particle distribution vis-à-vis wetting and dispersibility for the final composition. The drink mixes were fractionated based on size using the sieves described in the as reflected in Table 3. Accordingly, the w/w percentage of such particles should be reduced as described in the present specification. Particles having sizes above 425 microns are difficult to disperse due to their size and their amount too should therefore be minimized as described in the present specification.

Referring to Table 4, (see rows B-G), when the effects of various acid contents on wetting time of Fraction 250>x>105 microns were compared, a trend was observed—wetting time decreased with increasing acid content. This trend is illustrated in FIG. 6 (note that the trend line only represents data observed for the Fraction 250>x>105 microns). The data regarding the composition in Table 4, row H, was not included in the analysis presented in FIG. 6 because that composition contained an undesirably low amount of particles having 250>x>105 microns in size (4.5% w/w) and hence it would not represent the behavior of the whole composition.

TABLE 4

Particle Size Distribution (in microns) and Wetting Time for Fraction 250 > x > 105

| | | 1 >425 | 2 425 > x > 250 | 3 250 > x > 105 | 4 105 > x > 75 | 5 <75 | 6 Wetting time (s) for 250 > x > 105 Fraction | 7 % cocoa extract not agglomerated (fines) | 8 pH |
|---|---|---|---|---|---|---|---|---|---|
| A | No acid | 3.2 | 13.5 | 65.5 | 10.8 | 6.3 | 10.6 | 7.5 | |
| B | 10% acid; 19% extract | 7 | 23.5 | 54 | 10.3 | 4.8 | 15 | 6.1 | 3.05 |
| C | 20% acid; 17% extract | 13.6 | 36 | 41.8 | 5.5 | 2.7 | 12.8 | 3.6 | 2.78 |
| D | 20% acid; 19% extract | 28.3 | 33.3 | 32.3 | 4 | 1.7 | 13.2 | 2.3 | 2.86 |
| E | 30% acid; 19% extract | 30.2 | 39.9 | 25.7 | 2.1 | 0.9 | 10.9 | | 2.76 |
| F | 35% acid; 13% extract | 31.6 | 48.6 | 18.4 | 0.9 | 0 | 6.3 | | 2.81 |
| G | 40% acid; 12% extract | 23.5 | 46.7 | 25.5 | 2.6 | 1.2 | 6.7 | 2.0 | 2.68 |
| H | 55% acid; 19% extract | 72.7 | 21.8 | 4.5 | 0.5 | 0.3 | 10.5 | 0.5 | 2.59 |

Example 6 Beverage Mixes

Following the procedure described in Example 1, the following dry drink mixes were prepared.

The mixes contained at least 5 mg/g (−)-epicatechin and at least 53 mg/g total flavanols and procyanidins (profile 1-10).

Plum Flavored Drink Mix

| INGREDIENT | % | g/serving |
|---|---|---|
| STAR-DRI 100 MALTODEXTRIN 10 DE | 49.37 | 3.258 |
| CITRIC ACID FINE GRANULAR | 10.0 | 0.66 |
| MALIC ACID | 11.36 | 0.75 |
| EXTRACT, COCOA micromilled | 11.36 | 0.75 |
| PLUM FLAVOR | 11.36 | 0.75 |
| POTASSIUM CITRATE | 3.16 | 0.208 |
| SUCRALOSE, MICRONIZED | 1.21 | 0.08 |
| ACESULFAME K | 0.83 | 0.055 |
| ASCORBIC ACID | 1.14 | 0.075 |
| SILICON DIOXIDE | 0.20 | 0.013 |
| TOTAL | 100% | 6.60 g |

B. Citrus Flavored Drink Mix

| INGREDIENT | % | g/serving |
|---|---|---|
| STAR-DRI 100 MALTODEXTRIN 10 DE | 43.21 | 2.852 |
| CITRIC ACID FINE GRANULAR | 31.82 | 2.1 |
| EXTRACT, COCOA micromilled | 11.36 | 0.75 |
| POMELO FLAVOR | 7.58 | 0.50 |
| POTASSIUM CITRATE, MONOHYDRATE | 3.18 | 0.21 |
| SUCRALOSE, MICRONIZED | 1.52 | 0.1 |
| ASCORBIC ACID | 1.14 | 0.075 |
| SILICON DIOXIDE | 0.20 | 0.013 |
| TOTAL | 100% | 6.60 g |

Example 7 Drink Palatability Testing

To test palatability of the drink mixes having several fruit flavors, the following tests were conducted.

Seventy subjects were asked to consume the beverage (prepared by dissolving 6.6. g of dry drink mix in 500 ml water) and rate the palatability of the beverage for overall liking using a 7 point Hedonic Scale (see Hedonic Test in Manual on Sensory Testing Methods, ASTM committee E18, page 32). Number 7 represented "really like" and Number 1 represented "really dislike." Results with a score of 5 and above were considered "palatable." As a person of skill in the art can appreciate, some of the dislike for the beverage may be the result of a particular dislike for a certain fruit flavor (e.g. citrus vs plum) and not due to bitterness and/or astringency. The results are presented in FIG. 8.

In another experiment, seventy seven subjects evaluated the beverages. The results are represented in Table 5 below.

TABLE 5

Palatability Testing - Six Flavors, 4 oz sample

| Flavor | Hedonic Scale Average (Point scale 1-9) |
|---|---|
| A | 5.71 |
| B | 5.53 |
| C | 6.27 |
| D | 6.22 |
| E | 5.76 |
| F | 5.49 |

What is claimed is:

1. A non-chocolate flavored water-soluble composition comprising a sweetener, an edible acid, a cocoa extract that includes cocoa extract particles, and a water soluble carrier, wherein the cocoa extract particles comprise (i) no more than 5% particles larger than 841 microns; (ii) no more than 4% particles 74 microns or smaller; and (iii) no more than 40% particles ranging between 421 and 841 microns based on the weight of the non-chocolate flavored water-soluble composition.

2. The non-chocolate flavored water-soluble composition of claim 1, wherein the water soluble carrier comprises maltodextrin.

3. A beverage comprising water and the non-chocolate flavored water-soluble composition of claim 1.

4. The beverage of claim 3, wherein the acid is selected from the group consisting of citric acid, malic acid, tartaric acid and any combination thereof.

5. The beverage of claim 4, wherein the pH is from about 2 to about 4.

6. The beverage of claim 5, wherein the sweetener is sucralose, acesulfame K or a combination thereof.

7. The beverage of claim 4, wherein the pH is from about 2.6 to about 3.

8. The non-chocolate flavored water-soluble composition of claim 1, wherein the acid is selected from the group consisting of citric acid, malic acid, tartaric acid and any combination thereof.

9. The non-chocolate flavored water-soluble composition of claim 8, wherein the water soluble carrier comprises maltodextrin.

10. The non-chocolate flavored water-soluble composition of claim 8, wherein the composition meets the Predetermined Dispersibility Test.

11. The non-chocolate flavored water-soluble composition of claim 10, wherein the sweetener is sucralose, acesulfame K or a combination thereof.

12. The non-chocolate flavored water-soluble composition of claim 11, wherein the edible acid is selected from the group consisting of citric acid, malic acid and any combination thereof.

13. The non-chocolate flavored water-soluble composition of claim 8, wherein the edible acid is in the amount of no more than 40 w/w percent.

14. The non-chocolate flavored water-soluble composition of claim 13, wherein the water soluble carrier comprises maltodextrin.

15. A water-soluble dry powder composition comprising cocoa extract, an edible acid in the amount of at least 18 w/w percent and a sweetener, wherein the composition comprises particles having the following size distribution: (i) no more than 5% particles larger than 841 microns; (ii) no more than 4% particles 74 microns or smaller; and (iii) no more than 40% particles ranging between 421 and 841 microns, based on weight of the water-soluble dry powder composition.

16. The water-soluble dry powder composition of claim 15, wherein the composition comprises no more than 1% of particles larger than 841 microns.

17. The water-soluble dry powder composition of claim 15, wherein the edible acid is in the amount of no more than 25% and the amount of particles ranging between 251 and 420 microns is no more than 20%.

18. The water-soluble dry powder composition of claim 15, wherein the edible acid is in the amount of at least 30% and the amount of particles ranging between 251 and 420 microns is no more than 40%.

19. The water-soluble dry powder composition of claim 17, wherein the edible acid is selected from the group consisting of citric acid, malic acid, tartaric acid, and any combination thereof.

20. The water-soluble dry powder composition of claim 18, wherein the edible acid is selected from the group consisting of citric acid, malic acid, tartaric acid, and any combination thereof.

21. A water-soluble dry powder composition comprising cocoa extract, an edible acid in the amount of at least 18 w/w percent and a sweetener selected from sucralose, acesulfame K, or a combination thereof, wherein the edible acid to cocoa extract ratio is 0.8 and above, wherein the pH is from about 2 to about 3, and wherein the composition further comprises maltodextrin.

* * * * *